Figure 1:
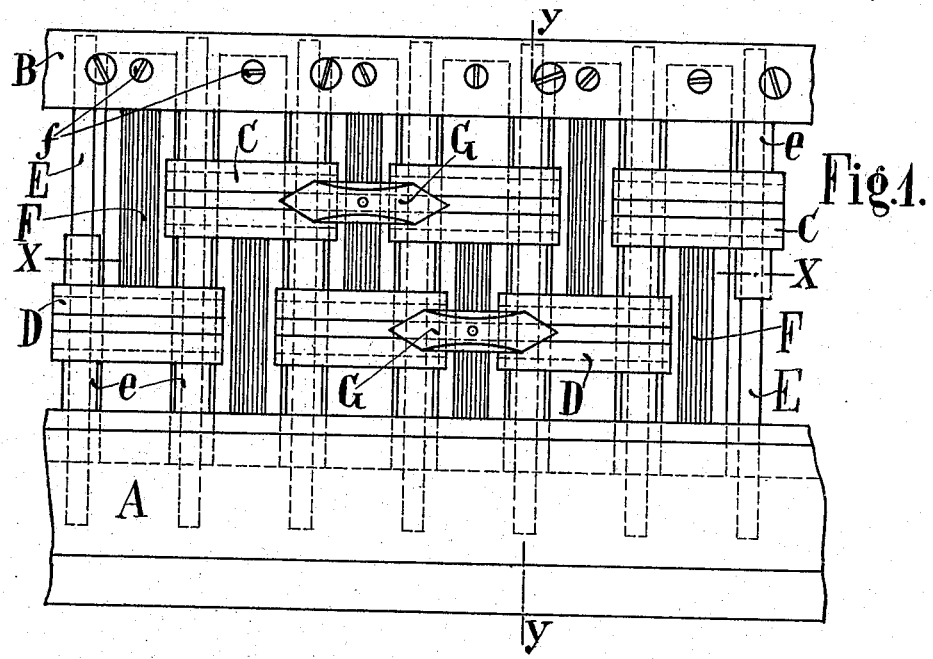

C. SCHNEIDER-GERSTER.
DOUBLE BATTEN FOR RIBBON LOOMS.
APPLICATION FILED APR. 8, 1907.

911,165.  Patented Feb. 2, 1909.

Witnesses
John Thomas Johnston
Alfred Edwin Avery

Inventor
Carl Schneider-Gerster
per Rayner & Co
Attorneys

UNITED STATES PATENT OFFICE.

CARL SCHNEIDER-GERSTER, OF GELTERKINDEN, SWITZERLAND.

DOUBLE BATTEN FOR RIBBON-LOOMS.

No. 911,165.  Specification of Letters Patent.  Patented Feb. 2, 1909.

Application filed April 8, 1907. Serial No. 366,959.

*To all whom it may concern:*

Be it known that I, CARL SCHNEIDER-GERSTER, a citizen of Switzerland, residing at Gelterkinden, Switzerland, have invented certain new and useful Improvements in a Double Batten for Ribbon-Looms, of which the following is a specification.

There are already known to be in use double battens in ribbon looms, in which, for the purpose of reducing the breadth of the loom, the guides of the upper row of shuttles are arranged alternately to those of the lower row of shuttles. Of this nature also is the double batten for ribbon looms which constitutes the subject of the present invention. In the case of the known double battens of this kind, the shuttle guides are fixed by screws or similar means to supporting rods or plates, while, to render the fitting of the shuttle guides easier and to reduce the space necessary to the smallest amount, according to my invention, the shuttle guides of one row and those of the other row which alternate with them are mounted at their ends, by means of eyes, upon small pins supported by the batten-cheek and batten-head, so that one end eye of each shuttle guide of one row, and the adjoining end eye of the neighboring shuttle guide of the other row are both placed upon one of those pins and are held in position, by collars placed upon each pin, at a due distance from each other and from the batten-cheek and batten-head.

The drawing attached hereto shows one example of the construction of this new double batten for ribbon looms.

Figure 2:
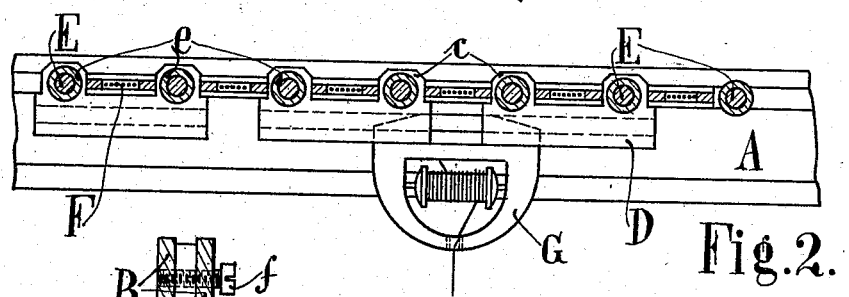
Figure 3:
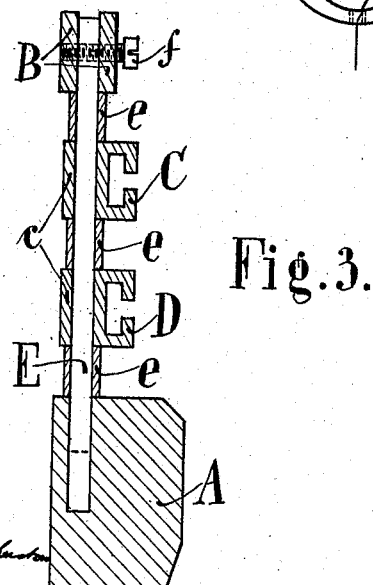

Figure 1 shows in front elevation a portion of the batten, so far as is necessary to explain the invention. In particular the driving mechanism for the shuttles has been left out for the sake of clearness. Fig. 2 is a section of the line X—X and Fig. 3 one on the line Y—Y in Fig. 1.

A is the batten-cheek and B the batten-head consisting of two rods lying one behind the other. C are the shuttle guides of the upper, and D those of the lower row, and, as is to be seen in Fig. 1, the shuttle guides C are arranged alternately to those indicated by D. These shuttle guides each have on the back two end eyes $c$ Fig. 2, and are mounted loosely by means of same upon pins E and in such a way that one end eye of each shuttle guide C and the adjoining end eye of the neighboring shuttle guide D are both placed upon one of the pins E.

The pins E which, according to the drawing, are circular in section, are fixed below in the batten-cheek and above between the rods held together by screws which form the batten-head; and upon the pins, between the shuttle guides C and those marked D, between the shuttle guides C and the batten-head B, and between the shuttle guides D and the batten-cheek A, are placed collars $e$ which have the purpose of keeping the shuttle guides in position with respect to each other and to the batten-cheek and batten-head in such a way that all the shuttle guides C are at exactly the same level, and also those marked D. Between each pair of adjacent pins E a slay F is arranged, which, on one hand, is set into a groove in the batten-cheek, and, on the other, fixed between the rods of the batten-head by means of a screw $f$.

G are the shuttles, of which one is available for each of the gangs of warp threads led through the slay splits F (the drawing shows only two shuttles). Each shuttle makes its stroke between two adjacent guides by being driven from one into the other. This drive may be effected, *e. g.*, for the upper row of shuttles by a driving rod with projections reaching between and propelling the individual shuttles, which rod is moved to and from along the batten-head; while for the lower row of shuttles there is provided a rod movable to and fro and fitted with driving fingers reaching between the individual shuttles. This driving mechanism has been left out of the drawing for the sake of clearness and as it can be understood without further illustration.

The shuttle guides consist, in the drawing, of one piece; but they could also be made in upper and lower halves. The pins carrying the shuttle guides could also be made square instead of round in section.

What I claim as my invention and desire to secure by Letters Patent is:—

In a double batten for ribbon looms, a batten cheek and batten head, vertical rods mounted on said cheek and head, shuttle races arranged in two rows alternately with each other and provided with lugs having eyes adapted to fit over said vertical rods, and distance pieces between the lugs, batten cheek and batten head, substantially as herein described.

In witness whereof I have hereunto set my hand in the presence of two witnesses.

CARL SCHNEIDER-GERSTER.

Witnesses:
ANDREW HEER,
W. KAUFFMANN.